Feb. 10, 1925.

W. G. CADBY 1,525,567

SANITARY WATER GLASS

Filed Jan. 29, 1924

W. G. Cadby,
Inventor

By
Attorney

Patented Feb. 10, 1925.

1,525,567

UNITED STATES PATENT OFFICE.

WILLIAM G. CADBY, OF WALLACE, IDAHO.

SANITARY WATER GLASS.

Application filed January 29, 1924. Serial No. 689,294.

*To all whom it may concern:*

Be it known that I, WILLIAM G. CADBY, a citizen of the United States, residing at Wallace, in the county of Shoshone and State of Idaho, have invented certain new and useful Improvements in Sanitary Water Glasses, of which the following is a specification.

This invention relates to improvements in sanitary water glasses.

An object of the invention resides in providing a sanitary water glass wherein water and other liquid may be kept hot or cold through the medium of heating or cooling means carried by the glass and separated from the liquid or water in the glass to prevent impurities in the cooling or heating medium from contaminating the water or other liquid to be consumed from said glass.

Another object of the invention is to provide means for carrying out the above purpose including a pair of cooperating sections, one of which is adapted to contain the cooling or heating medium and the other of which is adapted to contain the liquid for consumption, one of said sections interfitting with the other in a manner to provide a liquid tight connection between the sections so that the heating or cooling medium in one of the sections will be contained within the section when the same is tripped or tiled while the liquid in the other section is being consumed.

A further object of the invention resides in providing a pair of interfitting sections formed of glass, one of said sections being substantially cylindrical and provided with a tapered ground edge at the upper inner edge thereof, the other section being of frusto-conical form throughout the major portion thereof, the free end portion having a substantially cylindrical portion of a size equal to the size of the first mentioned section, and a tapered ground portion adjacent said cylindrical portion for cooperation with the ground portion of the first mentioned section to provide a tight compartment between the outer and inner sections for containing a heating or cooling medium for the contents of the inner section.

The invention also includes other objects and details of construction which will be more particularly pointed out in the following description and set forth in the claim directed to a preferred form of the invention, it being understood that variations may be made in the specific arrangement of the parts without departing from the scope and spirit of the invention.

In the drawing, forming a part of this application,

Figure 1:
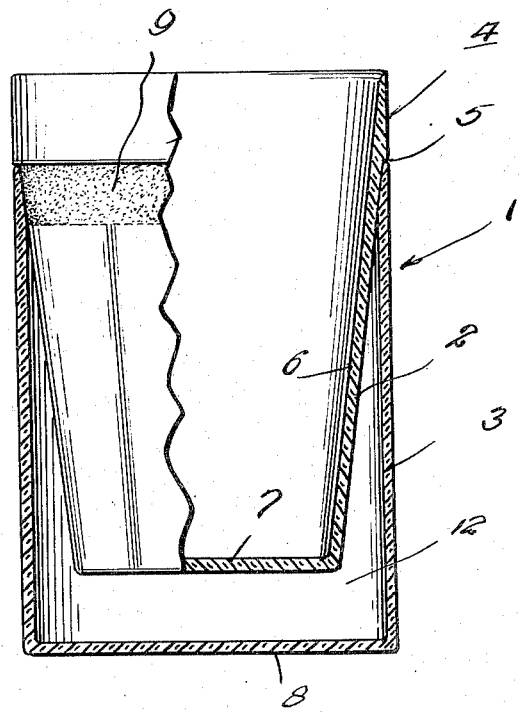
Figure 1 is a view of the glass section in cooperating assembled relation, portions thereof being shown in section.
Figure 2:
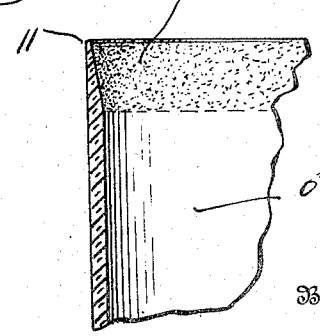
Figure 2 is a sectional view through a portion of the upper edge of the outer container section showing the tapered ground surface on the interior thereof.

The sanitary glass which is indicated generally at 1, is composed of inner and outer sections 2 and 3 respectively, the inner section being open at the upper end and having a cylindrical portion 4 extending downwardly from the upper end thereof and terminating in a shoulder 5, from which surface an inner surface of the glass 2 is tapered downwardly in frusto conical form as indicated at 6 to the bottom 7 which terminates in spaced relation relative to the bottom 8 of the outer glass member 3. Immediately below the shoulder 5, the tapered or conical portion of the glass is formed with a ground surface 9 forming a band entirely around the glass adjacent the shoulder 5 as is clearly shown in Figure 1 of the drawing.

The glass section or member 3 is of cylindrical form above the bottom 8, the upper end being open and the inner edge thereof being bevelled as indicated at 10 to provide a relatively thin upper edge as at 11 adapted to contact and seat against the shoulder 5 of the glass section 2. The inclined inner surface 10 is of frusto conical form to correspond with the ground ring 9 and is ground as indicated for cooperation with the ground ring 9 on the inner section 2 to provide an accurate fit, and thereby forms a liquid tight joint between the glass sections when in interfitting relation as indicated in Figure 1. These sections cooperate as shown in Figure 1 to form a chamber 12 around the lower end of the glass section 2, as well as around substantially the entire frusto-conical portion thereof.

The inner section 2 of the glass is adapted to contain water or other liquid beverage which it may be desired to retain in either a cold or warm state, and which may be conveniently done in the present case by filling the chamber 12 between the inner and outer glass sections with a cooling medium, such as ice or cold water, or if desired to keep the contents hot, the compartment should be filled with a heating medium, such as hot water. In this way, any impurities which may be contained in the cooling or heating medium are prevented from intermingling with the beverage or fluid contained in the inner receptacle for consumption, while at the same time, said beverage may be either retained in a hot or cool state, thru the medium of the elements contained within the chamber 12.

It will also be noted that the glass may be tipped up in the usual way for either drinking or pouring the beverage from the inner section 2 and due to the accurate fit of the ground sections 9 and 10 cooperating as shown in Figure 1, the heating or cooling medium contained in the chamber 12 will be prevented from leaking out between the joint in the sections. It will therefore be apparent from the above description, that a novel form of sanitary glass has been provided including a pair of cooperating sections having portions of equal diameter, so that the glass as a whole presents an outer cylindrical surface above the bottom 8, and at the same time a heating or cooling medium may be provided for the beverage contained in the inner section 2 which is prevented from co-mingling with the contents of said section, so that a simple and efficient sanitary glass is formed which may be constructed at a relatively small cost.

What is claimed is:

A sanitary drinking glass of the type described comprising a pair of inner and outer cooperating glass sections, said outer section being of cylindrical form from end to end and closed at its bottom, the open upper end thereof being ground on its inner face to form a tapered portion, the inner section having a cylindrical upper portion equal to the external diameter of the first named section to render it flush with the outer surface of the outer section, the portion of said inner section below said cylindrical portion being tapered downwardly to render it substantially frustro-conical in shape, said frustro conical portion extending downwardly into the outer section with its bottom spaced above the bottom of the latter, the juncture of the frustro-conical portion with the cylindrical portion forming a shoulder to rest on the upper edge of the outer section, the upper end of said frustro-conical portion being ground throughout its circumference, the ground surfaces of said sections cooperating with each other to form a liquid-tight joint between the two sections, and the lower portions of said sections being spaced apart to provide a chamber between themselves which is adapted to receive either a heating or cooling medium.

In testimony whereof I affix my signature.

WILLIAM G. CADBY.